Dec. 20, 1960 J. LERNER 2,964,960
CHANGE SPEED UNIT
Filed April 29, 1958 3 Sheets-Sheet 1

INVENTOR.
JULIUS LERNER
BY
ATTORNEYS

Dec. 20, 1960     J. LERNER     2,964,960
CHANGE SPEED UNIT

Filed April 29, 1958     3 Sheets-Sheet 2

INVENTOR.
JULIUS LERNER
BY
ATTORNEYS

INVENTOR.
JULIUS LERNER
ATTORNEYS

United States Patent Office 2,964,960
Patented Dec. 20, 1960

2,964,960
CHANGE SPEED UNIT

Julius Lerner, Drexel Hill, Pa., assignor to Sun Oil Company, Philadelphia, Pa., a corporation of New Jersey Filed Apr. 29, 1958, Ser. No. 731,773

3 Claims. (Cl. 74—353)

This invention relates generally to change speed devices and more particularly to an improved construction of gear type rotary change speed units.

A change speed unit constructed in accordance with and embodying the principles of the present invention finds particular utility in apparatus for measuring response time of control systems, for example, in apparatus such as disclosed in co-pending application Serial No. 705,682, filed December 27, 1957, now Patent No. 2,857,928, dated October 28, 1958, in which a change speed device is shown operatively interposed between a constant speed motor and the rotating arm of a potentiometer.

In this type of equipment, the change speed device must have a very wide range, and it must maintain a selected constant speed during a given operation. In addition, it must be capable of accurately repeating a speed and adapted for rapid speed changes. In a gear type change speed unit speed changes may be made by actually changing the gears in a train thereof or by shifting a power take-off gear for selective engagement with the gears mounted on a gear cone. Neither of these expedients has proven to be entirely satisfactory because in an arrangement in which gears must be removed from the gear train and replaced by other gears, it is not possible to effect the speed change with the necessary rapidity, and in the case where a power take-off gear is shifted along a cone of gears for selective engagement with the gears of the latter, the organization is rather bulky and frequently must be idled during a speed change.

Accordingly, a principal object of the present invention is to provide a change speed unit that is inherently capable of being made rugged and compact.

Another important object of the present invention is to provide such a change speed unit which is capable of constant speed while in a selected position, repeating a desired speed accurately and which at the same time is operable for rapidly effecting speed changes.

Still another object of the present invention is to provide such a change speed unit in which the speed change is effected by a rotary motion so that the unit inherently lends itself to automatic programming.

Other objects and advantages of the present invention will appear more fully hereinafter, it being understood that said invention consists substantially in the combination, construction, location and general arrangement of parts, all as described in detail, as shown in the accompanying drawings and as finally pointed out in the appended claims.

Figure 1:
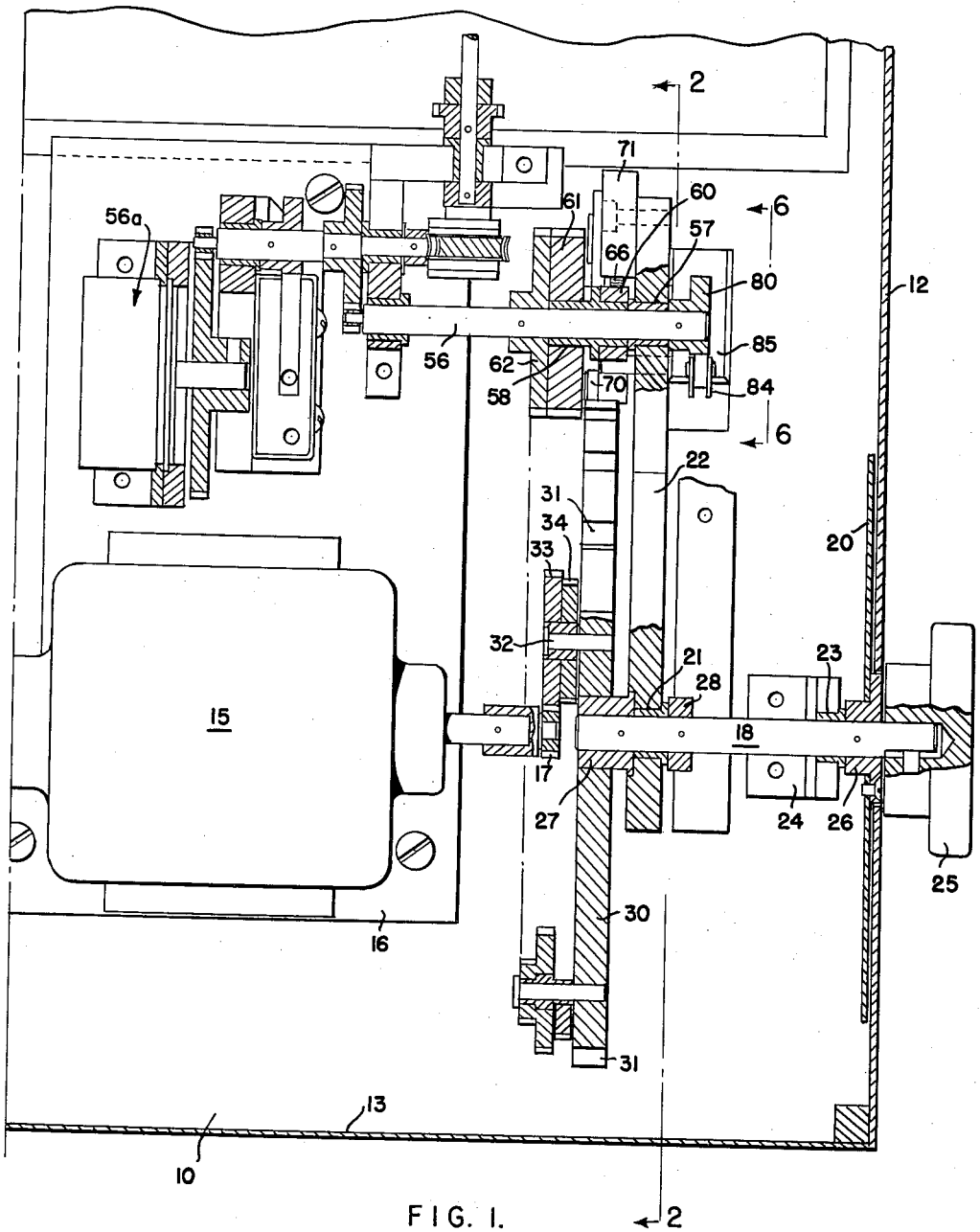
Fig. 1 is a horizontal section through apparatus constructed in accordance with and embodying the principles of the present invention.
Figure 2:
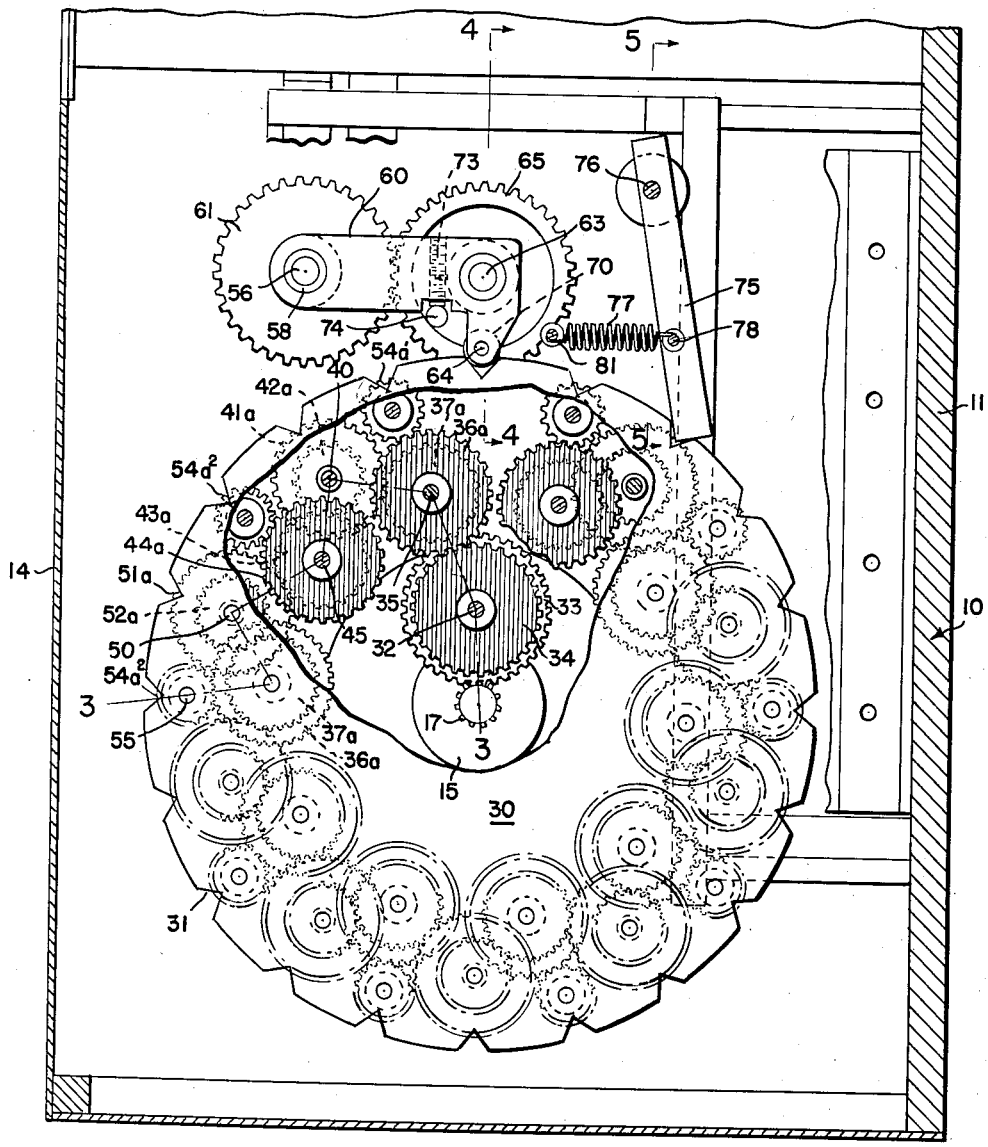
Fig. 2 is a vertical section on line 2—2 of Fig. 1.
Figure 6:
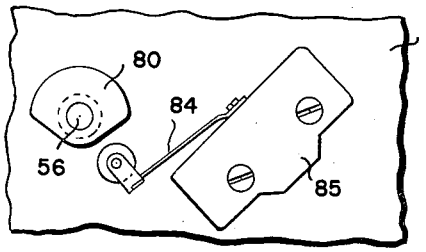
Fig. 6 is a view taken as indicated by line 6—6 of Fig. 1.
Figure 3:
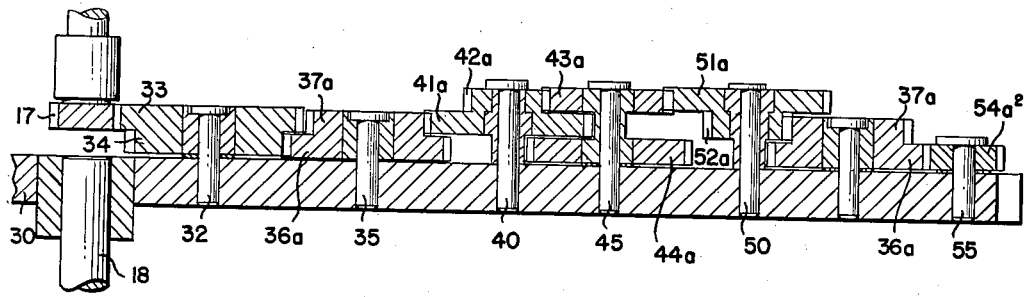
Fig. 3 is a developed section as indicated by line 3—3 of Fig. 2 showing the organization of gear cones at the power input end of a series thereof.
Figure 4:
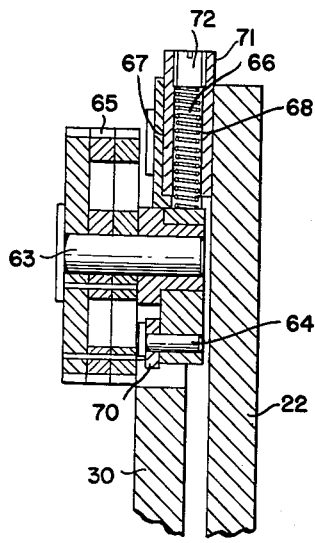
Fig. 4 is an enlarged section on line 4—4 of Fig. 2.
Figure 5:
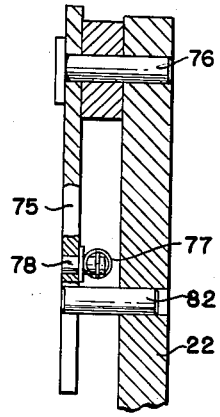
Fig. 5 is an enlarged section on line 5—5 of Fig. 2.

Referring to Figs. 1, 2 and 3, the speed changer is illustrated as mounted in a casing or housing 10 having a base 11, front wall 12, side wall 13 and top wall 14. A driving motor 15 is mounted on an elevated shelf or bracket 16, and has a drive pinion or gear 17 whose axis is coincident or aligned with a shaft 18 rotatably mounted in a bearing 21, in a vertical partition 22 intermediate front wall 12 and shelf 16, and a bearing 23 mounted on a bracket 24.

Shaft 18 extends through a coaxial opening in front wall 12 and has pinned thereto a flanged collar 26 to which is fixed an index or indicator dial 20 visible through an opening (not shown) in front wall 12. The outer end of shaft 18 has a speed selecting and changing control knob 25 secured therein. Shaft 18 is held against longitudinal or axial movement by a hub 27 secured on its inner end, and engaged in a shallow recess in the inner surface of partition 22, and a collar 28 secured to shaft 18 and engaging the outer surface of partition 22.

Hub 27 is the hub of a gear cone mount or intermediate gear train mounting plate 30 which latter is circular and has notches 31 spaced uniformly circumferentially of its periphery. Plate 30 is thus selectively rotatable by control knob 25. Near hub 27, plate 30 has set therein a stub shaft or pin 32 on which is rotatably mounted an idler gear cone comprising outer gear 33 and inner gear 34. Outer gear 33, in the illustrative example, has 45 teeth and meshes with drive gear 17 which, again in the illustrative example, has 16 teeth.

Inner gear 34 meshes with the first gear cone of the repetitive sets of four gear cones arranged in a continuous series around the circular gear cone mount 30. In the illustrative example, there are five sets of gear cones, the fourth cone of the fifth set being omitted to provide an "idle" or "neutral" point. In this connection, it will be noted that none of the gears mounted upon the third cone of the fifth set are directly engaged or meshed with any of the gears mounted upon the idler gear cone aforesaid.

Referring more particularly to Fig. 3, each set of gear cones includes a first gear cone mounted on a stub shaft or pin 35 set in plate 30 and including an inner gear 36a meshing with idler gear 34, and an outer gear 37a. In the illustrative example, gear 36a has 40 teeth as has also idler gear 34. Outer gear 37a has 30 teeth and meshes with the inner gear 41a of the second gear cone, gear 41a having 40 teeth. This latter gear cone is rotatably mounted on a stub shaft or pin 40 set in plate 30 and includes a 20-tooth outer gear 42a.

Gear 42a drives a 30-tooth outer gear 43a of the third gear cone, which is rotatably mounted on a stub shaft or pin 45 set in plate 30, and includes a 40-tooth inner gear 44a. Gear 43a also meshes with a 40 teeth outer driving gear 51a of the fourth gear cone. This latter gear cone is rotatable on a stub shaft or pin 50 set in plate 30 and includes a 20-tooth inner gear 52a which drives the 30-tooth outer gear 37a of the first gear cone of the next set of four gear cones.

Referring to Figs. 2 and 3, the 40-tooth gears $36a$ and $44a$ of the first and third gear cones respectively mesh with 18-tooth driving gears $54a^1$ and $54a^2$ rotatably mounted on stub shafts or pins 55 set in plate 30. These gears are radially aligned with alternate notches 31 in plate 30 and their peripheries extend beyond the bottoms of the notches. The driving gears 41a and 51a respectively, of the second and fourth cones, are also radially aligned with notches 31 in alternation with gears $54a^1$ and $54a^2$ and their peripheries extend outwardly beyond the bottoms of the notches. The pitch circles of driving gears 41a, 51a, 54a¹ and 54a² are tangent to a common circle concentric with motor drive gear 17 and shaft 18, as shown.

With the gear ratios as stated, if the speed of the first cone of the first set is taken as 1, the speed of the second cone is ¾, that of the third cone is ½, and that of the fourth cone is ⅜. The speed of the first cone of the second set of cones is ¼. The speed ratios of pairs of meshing cones are alternately 4:3 and 3:2 so that the rate at which the gear cones rotate progressively diminishes from the power input end toward the power output end of the series thereof. The stated gear ratios are exemplary, of course, and may be modified to effect, from the power input toward the power output end of the series of gear cones, a progressive increase, instead of a progressive decrease, in the rate at which the gear cones rotate.

Referring to Figs. 1, 2, 4 and 5, an output shaft 56 (suitably connected to a potentiometer indicated at 56a) is mounted through a bearing 57 in partition 22 and serves as a rock shaft for an oscillatable arm 60 mounted on a bushing 58 on shaft 56. A gear 61 is rotatable on bushing 58 and pinned to a gear 62 fixed to shaft 56. Near its outer end, arm 60 has a pin 63 set therein on which is rotatably mounted a relatively wide faced output gear 65 constantly meshing with gear 61.

Arm 60 has a laterally extending free end in which is mounted a pin 64 carrying a roller 70 movable into notches 31 of plate 30. Arm 60 is biased toward plate 30 by a coil spring 66 seated in a recess 67 in one side of the arm and in a threaded bore 68 in a block 71 on partition 22. A set screw 72 in bore 68 adjusts the bias of spring 66. Movement of roller 70 into notches 31 is adjustably limited by a set screw 73 threaded into the arm 60 and engageable with a stop pin 74 in partition 22. Normally set screw 73 is adjusted so that roller 70 does not actually engage the walls of notches 31.

Plate 30 is held against rotation, due to the reaction of the gear train, by a detent arm 75 pivotally mounted upon a pin 76 on partition 22 and having a free end engageable in notches 31. A coil spring 77 connected between a pin 78 on arm 75 and a pin 81 on partition 22 biases arm 75 to engage notches 31. A pin 82 in partition 22 limits movements of detent arm 75 toward plate 30.

For illustrative purposes, output shaft 56 is shown as having a cam 80 on its outer end for periodically operating the arm 84 of a control switch 85 at a rate determined by the speed setting of the change speed gearing.

The described speed changer operates in the following manner. In Fig. 2, the apparatus is shown in the idle position. If knob 25 is rotated to turn plate 30 one notch clockwise, roller 70 is cammed out of notch 31 and rides along the periphery of plate 30 to swing the arm 60 and gear 65 away from the plate 30 against the influence of the coil spring 66. As roller 70 engages in the next notch 31, gear 65 engages driving gear 54a¹ which is constantly driven through the gear train from motor pinion 17. Simultaneously the detent arm 75 is cammed out of its notch 31 against the influence of the coil spring 77 and rides along the rim of the plate 30 and snaps into the next notch 31 to hold plate 30 against turning. Gear 65 is then driven at the highest set speed.

In the next position of clockwise rotation of plate 30, gear 65 engages driving gear 41a, and the output gear speed is thereby reduced in accordance with the reduced speed of the second cone relative to the first cone. At the next position, gear 65 engages the second driving gear 54a² which rotates at ½ the speed of the first driving gear 54a¹ and the output gear speed is still further reduced thereby in accordance with the reduced speed of the third cone relative to the second cone. In the fourth position, gear 65 meshes with gear 51a whose speed is ½ that of gear 41a and the output gear speed is still further reduced thereby in accordance with the reduced speed of the fourth cone relative to the third cone. This pattern of speed reduction is repeated with clockwise rotation of plate 30, and it will be noted that in the second of any pair of successive positions of the plate 30 the output gear speed is approximately $$\frac{\sqrt{2}}{2}$$

of the output gear speed attained with the plate 30 in the first of said positions, the result being that the changes in speed occur in approximately equal ratio steps, as is desirable for the type of operation for which it is designed.

It will be noted that all of the gears arranged to selectively engage the power take-off gear 65 turn in the same direction.

With the described arrangement, there is no problem due to gears not meshing because all of the gears mounted on the plate 30 are always in mesh. In addition, the unit can be made very small and compact and, since all the shafts 32, 35, 40, 45 and 50 are short, they can be made comparatively small in diameter. The speed remains constant at the set value and any set speed can be repeated exactly. As it is not necessary to stop the unit during speed changes, and as the speed change motion is rotary, the unit is well adaptable to automatic programming.

What is claimed is:

1. A change speed unit comprising a rotatable disk-like gear cone mount, a plurality of gear cones arranged in a continuous series extending about said mount in alternating relation upon an inner and an outer gear cone circle which are both concentric with said mount, said gear cones being rotatably mounted upon said mount for movement therewith as a unit, a train of gears associated with the first of said gear cones and adapted for turning said first cone, and thereby each successive one of the gear cones, at a rate of speed progressively varying from the power input end to the power output end of said gear cones, the gears comprising the outer ones of said gear cones having pitch circles tangent to a common circle concentric with said mount, a plurality of idler gears meshing with gears comprising the inner ones of said gear cones, said idler gears having pitch circles tangent to the common circle aforesaid, and a power take-off means including a gear selectively engageable with the gears comprising the outer ones of said gear cones and with said idler gears for effecting a desired final output speed.

2. A change speed unit as defined in claim 1, wherein each idler gear is disposed radially outwardly from the associated inner gear cone, and the outer gear cones and the idler gears are alternately arranged, with the latter disengaged from and free of the gears comprising said outer gear cones.

3. A change speed unit as defined in claim 1, wherein the gear cones and idler gears are mounted upon respective stub shafts each of which is anchored at one end to the gear cone mount and extends laterally from one face of the latter, for rotation of the several gear cones and idler gears about axes parallel to the central axis of said mount.

References Cited in the file of this patent
UNITED STATES PATENTS

| | | |
|---|---|---|
| 684,433 | Isler | Oct. 15, 1901 |
| 922,880 | Garvin et al. | May 25, 1909 |
| 2,596,819 | Murphy | May 13, 1952 |